United States Patent [19]

Faulkner et al.

[11] Patent Number: 5,448,663
[45] Date of Patent: Sep. 5, 1995

[54] OPTICAL COUPLER

[75] Inventors: David W. Faulkner; Philip J. Smith, both of Ipswich, England

[73] Assignee: British Telecommunications public limited company, London, England

[21] Appl. No.: 835,440

[22] PCT Filed: Aug. 14, 1990

[86] PCT No.: PCT/GB90/01282
§ 371 Date: Feb. 28, 1992
§ 102(e) Date: Feb. 28, 1992

[87] PCT Pub. No.: WO91/03753
PCT Pub. Date: Mar. 21, 1991

[30] Foreign Application Priority Data
Sep. 1, 1989 [GB] United Kingdom ............... 8919799

[51] Int. Cl.[6] ............... G02B 6/26; G02B 6/42
[52] U.S. Cl. ............... 385/27; 385/47
[58] Field of Search ............... 385/27, 47, 40, 41

[56] References Cited

U.S. PATENT DOCUMENTS

| | | | |
|---|---|---|---|
| 4,318,058 | 3/1982 | Mito et al. | |
| 4,457,581 | 7/1984 | Johnson et al. | |
| 4,545,253 | 10/1985 | Avicola | 655/250 |
| 4,677,630 | 6/1987 | Fujita et al. | 372/32 |
| 4,682,843 | 7/1987 | Mahlein et al. | |
| 4,712,856 | 12/1987 | Albanese et al. | 385/41 X |
| 4,712,859 | 12/1987 | Albanese et al. | 350/96.16 |
| 4,781,427 | 11/1988 | Husbands et al. | 385/24 |
| 4,787,693 | 11/1988 | Kogelnik et al. | 350/96.16 |
| 4,803,692 | 2/1989 | Sakano et al. | 372/20 |
| 4,859,016 | 8/1989 | Shaw et al. | |
| 4,938,556 | 7/1990 | Digonnet et al. | 385/27 X |
| 4,962,995 | 10/1990 | Andrews et al. | |

FOREIGN PATENT DOCUMENTS

| | | |
|---|---|---|
| 8700699 | 1/1987 | European Pat. Off. |
| 0242802 | 10/1987 | European Pat. Off. |
| 0248517 | 12/1987 | European Pat. Off. |
| 59-126696 | 7/1984 | Japan |
| WO86/07221 | 12/1986 | WIPO |
| 8600430 | 1/1987 | WIPO |

Primary Examiner—Rodney B. Bovernick
Assistant Examiner—Robert E. Wise
Attorney, Agent, or Firm—Nixon & Vanderhye

[57] ABSTRACT

A reflective star coupler for a distributed switch optical network for narrow band and broad band broadcast communication incudes on port terminated in a reflective surface or device, a signal amplifier and/or filter is disposed in the path between the port and the reflective device to reintroduce the light from that port into the coupler in an amplifier state or selectively according to wavelength. The amplifying device may be a semiconductor laser having a reflective coating on one face thereof.

19 Claims, 3 Drawing Sheets

OPTICAL COUPLER

This invention relates to an optical coupler for a communication network.

A multipoint communication network, such as a local exchange for telephony, has conventionally used a copper wire central exchange-based switching network and electronic or mechanical switching. Following the development of optical fibres, optical networks have been developed. The advantage of an optical fibre-based network is that it can support considerably more simultaneous communications and/or communications of a considerably greater bandwidth over the same optical fibre.

Current passive optical networks (PONs) are based on conventional centralised switching techniques, using electronic switching devices. Their reliance on electronic switching in an otherwise optical fibre-based network band limits the paths in the network to the capacity of the switches, creating an 'electronic bottleneck'. Typically, current generations of electronic switches can support 64 kbit/s throughput. This is sufficient for a small number of simultaneous voice channels but it is inadequate for two-way switching of video as used, for example, in video conferencing. It is also inadequate for supporting broad band broadcast communications, such as high definition television.

Distributed switching is known in which the paths in a network are connected to nodal connectors. The network is broadcast based, each customer being able to receive the output of the other customer terminals.

However, these are currently limited to electronic networks because of the potential losses associated with the optical connectors which would be required at the network nodes.

U.S. Pat. No. 4,787,693 discloses a passive star optical coupler for a broadcast type local area network (LAN) in which a message transmitted by one user can be received by all others. The basic coupler is a reflective star arrangement in which one port of a transmissive star is terminated in a reflective surface in order to produce a coupler which is transparent to all terminals connected to the remaining ports.

There are, of course, various ways in which a reflective star coupler can be constructed which will be apparent to the skilled person. Another simple reflective coupler arrangement for a serial data bus is disclosed in U.S. Pat. No. 4,457,581.

However, as mentioned above, the main problem to be overcome is that of the losses in the coupler which can lead to a degradation in the signal passing through it. It is this which limits the applicability of optical fibre couplers to network applications in which a considerable number of couplers are required.

According to the present invention there is provided an optical coupler comprising a plurality of light transmissive elements communicatively coupled at a coupling point whereby in use light transmitted in each of the elements is coupled into each other of the elements, one of the elements being provided with light retransmissive means for reapplying light leaving the coupler in that element back to the coupling point, characterised in that the said one element is also provided with signal conditioning means in the path of the light transmitted along the one element.

Thus, the coupler is transparent to signals in the various elements, but the losses associated with the coupler can now be counteracted by the signal conditioning element. Alternatively, the signal conditioning element may be used to render the coupler transparent only at predetermined wavelengths or ranges of wavelengths.

In one form, the signal conditioning means are an amplifier. The signal conditioning means may also be a filter or a filter/amplifier combination.

When a filter is used it may be frequency domain or time domain selective.

The invention also extends to an optical switching network, for example, a passive optical network incorporating couplers according to the invention. The network may be a distributed switching network in which at least some of the nodes are constituted by the couplers.

According to another aspect of the invention there is provided an optical signal conditioning device comprising a laser having at least two light transmitting ports and characterised by reflecting means arranged to reflect the output of one port back into the laser to be emitted from the other port.

Reference is made to optical fibres and it will be understood that the present invention is equally applicable to electromagnetic radiation having wavelengths outside the visible light band, for example infra-red and ultra-violet light.

The present invention can be put into practice in various ways some of which will now be described by way of example with reference to the accompanying drawings, in which.

Figure 1:
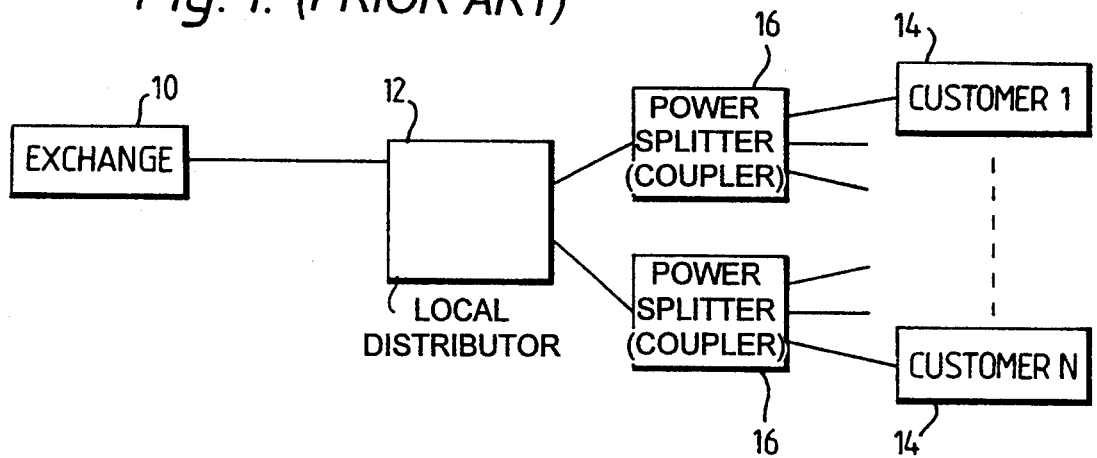
FIG. 1 is a block diagram of a passive optical network.

Referring to FIG. 1, a conventional passive optical network local exchange comprises a central exchange trunk switch 10 which is connected to a first local distributor 12. This, in turn, is connected to each of a plurality of customers 14 through a set of power dividers or splitters 16. The network constitutes a 'tree' configuration in which the central switch 10 routes calls to the various customers.

In order to compete with copper wire networks, it is necessary for an equivalent optical system to have equally low, or lower, installation and maintenance costs. Thus, on a basic level it is desirable to be able to implement an optical system to provide narrow band services, such as voice and low speed data telephony, and yet also provide the potential for evolution to broad band two-way switched services within the existing network on a higher level, since it has the inherent capacity and only the terminal equipment would need upgrading.

Figure 2:
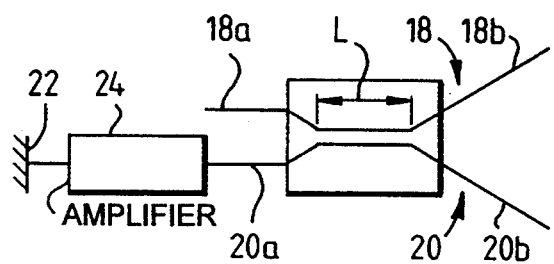
FIG. 2 is a schematic diagram of a 2×2 star coupler according to the invention.

Referring to FIG. 2, a 2×2 optical coupler is shown in which a first single mode fibre 18 is coupled, over a suitable coupling distance L, to a single mode fibre 20. The left-hand end 18a of the fibre 18 is connected to the trunk exchange switch 10. The right-hand ends 18b and 20b of both fibres 18 and 20 are connected to the power dividers 16 and thence to the customer terminals 14.

The left-hand end 20a of the fibre 20 is connected to a terminating reflective surface 22 through an amplifier 24. The coupler is used to replace the distributor 12 in FIG. 1. The coupler allows inter-communication of signals on either fibre, from either end to be transmitted on the other fibre. Thus, the network functions as a distributed switch for local traffic as the signals on one fibre are transmitted through the coupler to the other fibres in the network. In addition, the network still works as a tree structure to signals transmitted from the trunk exchange switch 10 to the customers 14. As a result, the network becomes a reflective coupler (as seen by each customer) in a distributed switching network while maintaining the tree structure required by the trunk exchange switch 10. Customer access to the network is via a single mode opto-electronic transceiver with high peak transmission power and high sensitivity.

There are other forms of star topology, but the reflective star topology has the advantage of only a single optical path to each customer and between any pair of customers.

While the reflective star coupler could be used without the amplifier, the losses resulting from reflection and the 'round trip' path afforded by the coupler are not insignificant. This problem is magnified when considerable numbers of such couplers are required in a single network. The level of the losses in the network rise with the splitting ratio of the signal at each coupler. Thus the amplifier is provided in order to enhance the signal level and compensate for the losses.

A particular advantage of locating the amplifier at the reflection is that signals make a double pass through the amplifying device and a double amplification is obtained.

One particularly suitable amplifier is a semiconductor laser device. In this case, the reflecting medium can take the form of a coating on the device and only a single fibre connection is required. Thus, a conventional single fibre device can be used. A suitable semiconductor laser device is discussed in more detail below.

Figure 3:
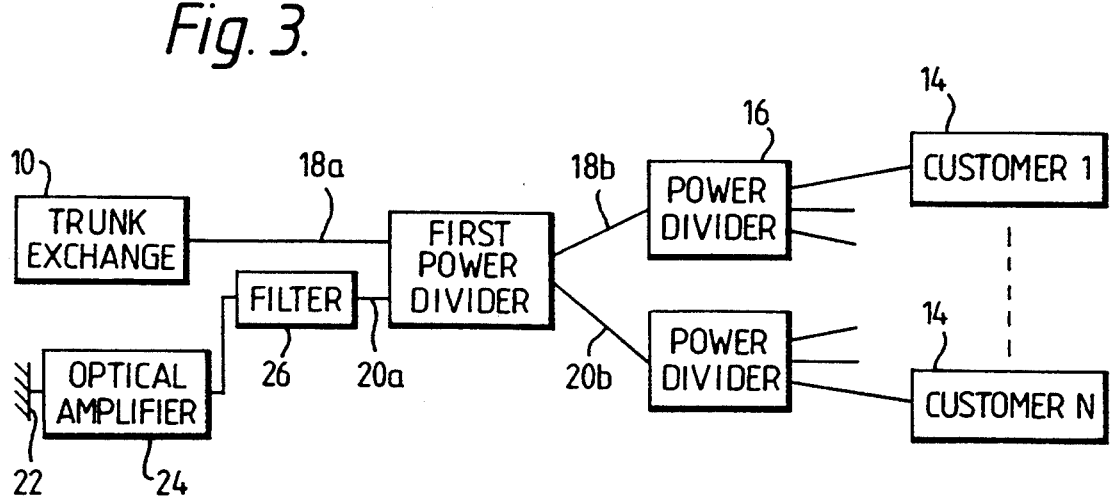
FIG. 3 is a block diagram of a reflective star distributed switch network incorporating an alternative form of star coupler also according to the invention.

FIG. 3 illustrates a modified network in which the reflection is made frequency selective by the use of a filter 26. Of course, the same effect would be achieved by using a wavelength selective amplifier (i.e. an active filter) as opposed to the separate amplifier and filter unit illustrated. In either case the customer 'sees' the reflective network across a selected waveband but not at other wavelengths. In all other respects, the network of FIG. 3 is similar to that in FIG. 1, adapted in accordance with FIG. 2, to constitute a distributed switch network, and like reference numerals have been used to denote the same elements.

As an alternative to wavelength filtering it would also be possible to set up a selectively reflecting arrangement based on a synchronised time division multiple access principle. This would require time slot allocation to customers, or groups of customers, eligible to access certain signals in selected time slots.

Both semiconductor lasers and fibre lasers are considered suitable two port light amplifying devices in order to amplify low level signals in the reflective arm of the coupler. These devices are normally bi-directional and can, therefore, be used between two terminals to amplify signals in both directions.

Figure 4:
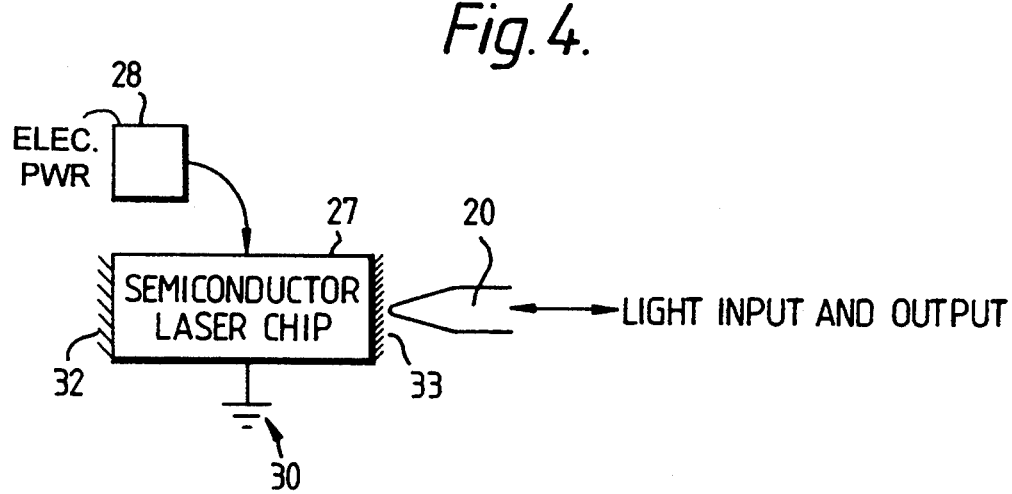
FIG. 4 is a schematic diagram of a modified semiconductor laser chip according to the invention.

A reflective laser amplifier reflector can be made for use in the present invention by adding a reflective mirror or coating to one port of a semiconductor laser device, as shown in FIG. 4.

The device comprises a semiconductor laser chip 27 conventionally powered from an electrical input 28 on one terminal and having a ground connection 30 to the substrate. A high reflectivity coating 32 is applied to one end of the chip in order to produce substantially total reflection at that end. The other end of the chip is aligned with a tapered lens ended optical fibre which constitutes the fibre 20 in FIG. 2. An anti-reflective coating 33 is preferably applied to the emitting end of the laser chip 27.

This effectively one port optical device can, therefore, be used as the amplifying reflective node of a reflective star coupler in a distributed switch network. The device can also be arranged as a filter having wavelength selection by applying a wavelength dependent multi-layer reflective coating, responsive to predetermined ranges of wavelengths of light to either of the faces of the device to admit or reflect light, respectively, according to the selected wavelengths. Alternatively, the laser chip itself can be arranged to be responsive to only a predetermined range of wavelengths.

When used as a reflective node, with gain, a semiconductor laser amplifier such as this would normally be biased below its emission threshold. It could also be used to transmit signals into the network by biasing above the threshold.

In time division multiplex (TDM) systems, this added signal facility could be used for network synchronisation and/or control and would normally have a low duty cycle.

The gain of the amplifier could also be varied by varying the bias current. This facility may be particularly useful in the event of failure of other methods of signal modulation and/or control or to add downstream signals in a customer terminal's time slot.

The laser chip could be a broad band device structure, such as a buried heterostructure, or a narrow band device, such as a distributed feedback laser.

The device structure and packaging is very similar to that used for conventional, unmodified semiconductor lasers. Consequently, single port amplifiers of this type can be packaged using conventional production methods which could means they are as cheap to produce as a conventional semiconductor laser source.

Figure 5:
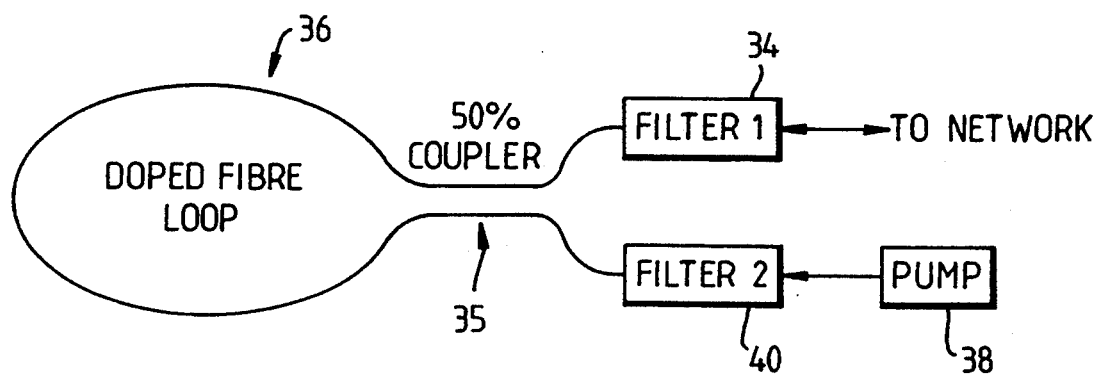
FIG. 5 is a further form of reflective coupler according to the invention.

A fibre laser amplifier-based coupler reflector is illustrated in FIG. 5. Signals from the network pass through a filter 34 and a 50% coupler 35, in both directions, by means of a doped fibre loop 36.

Power is provided by an energy pump 38 via a filter 40 to the coupler. The pump energy enters the doped fibre loop 36 at a level which permits signal gain to occur through photon interaction in the doped region. The amplified signal then passes out of the loop through the coupler and the filter 34 back into the network. The coupler 35 and doped loop 36 constitute an amplifier/reflector in which the light in the limb is readmitted via the loop and coupler (which couples together the ends of the loop) to the limb 20a.

The filter 34 is required to prevent pump energy from entering the network and/or to select wavelengths for amplified retransmission. Thus, in part, it serves the same function as the filter 26 in FIG. 3.

The filter 40 is required to prevent reflection of the signal at the end of the fibre connected to the pump 38.

Ideally, the filters 34 and 40 would not be required in a situation in which no wavelength filtering was used as the coupler would split power evenly at both the pump and signal wavelengths. Thus, the arrangement would be sufficiently well balanced to prevent signal energy arriving at the pump or pump energy being delivered to the network fibre.

Another form of reflecting termination for the fibre 20a is a single mode fibre loop connected to a coupler as is shown in FIG. 5. However, in this case, the filter 40 and pump 38 are dispensed with and the fibre to the right of the coupler can be left unterminated, or properly terminated if the coupler is unbalanced, as necessary. Again, the filter 34 is optional and can be included if the reflective coupler is to be wavelength selective. In this reflective coupler a bi-directional semiconductor laser chip is inserted in the loop to amplify the light passing into the loop and out via the coupler.

The manner in which the network is accessed by customers depends on whether the network is to be operated in the narrow band or broad band mode.

For narrow band services a network protocol could be designed to suit 64 kbit/s telephony and would be TDMA based. Broad band access could be either TDMA or wavelength division multiple access (WDMA). For narrow band services a synchronous rather than asynchronous TDMA system is bandwidth efficient and would result in relatively cheap electronics in the customer terminals. The cost of the system per customer would be roughly evenly split between the cost of the fibre, opto-electronic transceiver and customer access electronics. Installation costs could be minimised using blown fibre techniques and low cost polythene ducts.

A synchronous TDMA system depends upon obtaining an accurate clock to which all other clocks may be locked. This clock would ideally be a multiple of 8 kHz, which is the sampling rate for conventional telephony bandwidth signals. A master clock source would normally be found in the trunk exchange. This clock signal could be broadcast to all customers as a sequence of narrow, i.e. low duty cycle, pulses. The chosen sequence could be pseudo-random binary sequence or a Barker sequence which has a low probability of being mimicked by traffic on the network.

The clock in the customer's equipment can be delay-locked to the incoming sequence. Each customer is allocated a unique periodic time slot following the synchronisation pulse, which serves as a destination address. The customer's equipment contains a variable delay line which allows the customer to transmit pulses in any predetermined vacant time slot and communicate with other terminals via the reflective node. Each customer's terminal receives the sync. pulses at different times depending upon the optical path length from the reflective node. The round trip propagation delay must be determined and subtracted from the value stored in the variable delay line memory so that the correct destination time slots can be accessed. In a transparent network, such as a distributed switch network, the customer terminals will also be different distances from the low duty cycle reference pulses at the node sent out to lock all customers to that reference from the trunk exchange. It is therefore necessary to account for the delay in a transmitted message for another customer in reaching the distributive node to coincide with the time slot specific to the customer addressed.

Thus, the time at which one customer transmits must take account of the round trip to the customer addresses.

To overcome this each terminal is provided with a delay time memory specific to its distance from the reflective node. This is accessed for a particular customer and the appropriate adjustment made for the transmitted message to meet the time slot at the reflective node.

The round trip delay could be determined when the customer's signal is connected to the network. To do this, an upstream signal would be transmitted in a way which minimises interference with other users. For example, a pseudo-random binary sequence is transmitted at a low amplitude so that it is below the noise threshold of other receivers on the network. A correlation detector would then be used to determine the round trip delay. The main complication with this technique is that the customer transceiver would be required to switch from transmit to receive rapidly during ranging to recover enough of the sequence to make an accurate correlation.

An alternative method is to operate the system clock rate at a slightly higher rate than is strictly necessary, such as 8.08 kHz. Every 100th sync. frame of 124 micro seconds is designated as redundant and left empty for ranging. The added requirement of this approach is that additional timing and memory circuitry is required in each terminal to restore the 8 kHz reference data rate.

A further alternative method would be to send ranging pulses at a time when the traffic on the network is low so that the number of error bits detected by the customers' receivers is within set limits, for example 1 bit in 100,000.

A detailed call handling procedure is required to ensure calls are correctly received and transmitted. The essential features are as follows:

Incoming trunk calls are switched into the time slot of the destination terminal by the local exchange only if it is found to be empty for a predetermined time, e.g. 250 microseconds;

Some time slots are allocated to trunk call servers in the local exchange. Outside calls are made by accessing an empty trunk time slot;

Internal calls are made by accessing the time slot corresponding with the address of the terminal being called;

Common channel signalling procedures are implemented by designing the network to have an additional 8 kbit/s data channel with a 64 kbit/s channel. Most of the special features required in a private branch exchange (PBX) could be implemented using software resident in each terminal via this additional communication channel; and An address memory is required in each terminal which would be updated as each terminal is added.

The network size is limited by the type of reflective node(s) used and the optical power budget of the customer transceivers. The transmitters operate with a duty-cycle approximately equal to the split ratio and could, therefore, operate with a higher peak power than their normal continuous rating. This compensates for the loss of up to one pass through the network and ensures that the received power levels from the trunk exchange and customers are approximately equal. Initially, the network need not be fully utilised but sufficient power dividers would be needed to allow for growth.

The receiver sensitivity is inversely proportional to the bit rate and corresponding split ratio. If the split ratio is doubled, the round trip loss is quadrupled and the receiver sensitivity is halved. This poses a severe constraint on network expansion beyond a certain split ratio unless special measures are taken such as an increase in the gain of the optical amplifier.

Other methods of increasing the split ratio include an alternative star topology and the use of call concentration.

Figure 6:
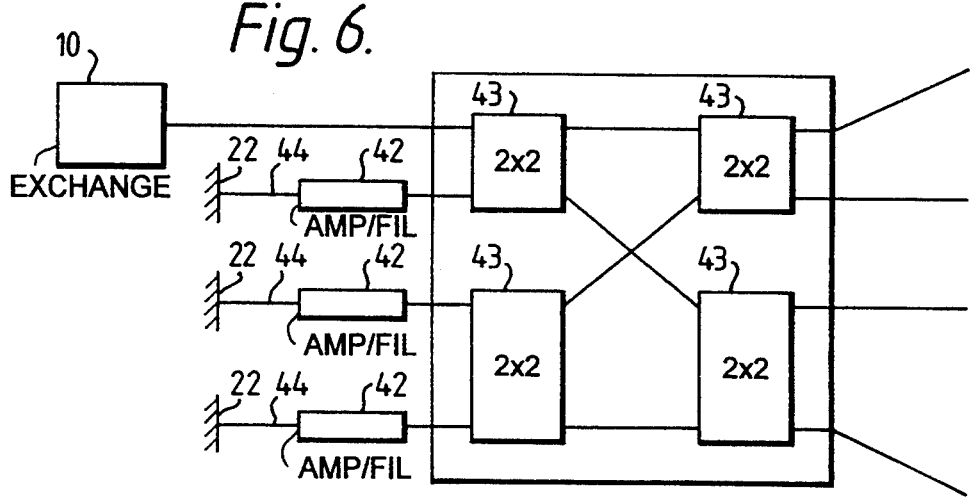
FIG. 6 is a block diagram of a 4×4 star coupler according to the invention.

Referring to FIG. 6, the number of reflective nodes can be increased if more 2×2 couplers are added to form a more complex matrix. This increases the reflected power by the number of nodes added. However, the method introduces multiple paths which would become apparent, causing corrupted signals, at very high bit rates and with coherent systems. The matrix in FIG. 6 is a 4×4 reflective coupler comprising four cross-connected 2×2 couplers 43 and similar to that in FIG. 2. A combined amplifier/filter 42 is connected to each reflective leg 44.

The use of trunking on the network itself allows call concentration. Time slots are then allocated to customers on demand. A separate signalling time slot would be required which would be common to all users. This technique adds complexity but allows better utilisation of the available bandwidth. The amount of concentration would depend upon the ratio of external to internal traffic and the grade of service allowed.

The nominal bit rate available to any customer is determined by the repetition rate of his time slot. However, the local network can support more information than a single bit in each time slot. Provided that an internal call is made, additional bits or a pulse amplitude modulated (PAM) signal could be added in the period of the time slot, provided that the destination terminal is able to receive the broader bandwidth signal.

The reflective star network could also be upgraded using coherent technology to provide interactive broad band services in the local area. A frequency division multiplex (FDM) access protocol is established which has similar features to that for TDM. Frequency bands are allocated to receive terminals in a similar way to time slots. The network no longer requires synchronisation, but would require an optical reference wavelength. Since it would pass only once through the network it could be used as a local oscillator for heterodyne systems. Indeed, the optical distributed switch system is particularly applicable to heterodyne terminals as the network can make do with only one local oscillator (LO) source for all terminals. This LO is advantageously located at the trunk exchange switch as a coherent source. Customer terminals would then access channels via the intermediate frequency band of the heterodyne system terminal. In order for a transmitting customer terminal A to access a customer terminal B the terminal A must transmit at a selected optical frequency which, when mixed with the LO frequency in the terminal B, provides the terminal B access intermediate frequency as the difference between the two. As a practical matter the intermediate frequency is desirably significantly lower, i.e. a radio frequency or lower, than the optical frequencies on the network in order to lessen the terminal costs.

Figure 7:
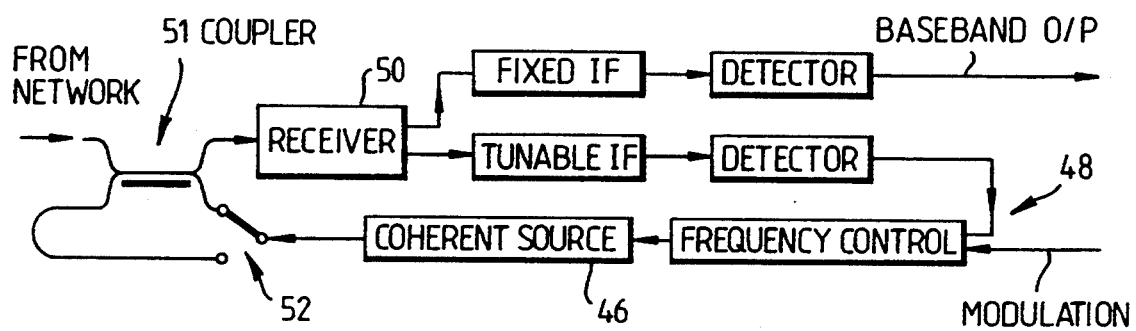
FIG. 7 is a heterodyne optical tuner incorporating the invention.

One method of locking the customer's laser to a selected frequency is shown in FIG. 7. The coherent customer terminal includes a tunable coherent source 46 which has a frequency control loop 48 referenced to the incoming local oscillator frequency detected by a receiver 50 connected to the network through a terminal coupler 51. This source is locally tuned to a selected frequency prior to transmission in the network via an optical switch 52. The reference local oscillator is received over the network to lock the local intermediate frequency (IF) tunable circuit. The optical switch 52 is then switched to allow transmission to the network through the terminal coupler 51.

As an alternative to TDMA and FDMA, code division multiple access (CDMA) could be used to allow selective access to each terminal by other terminals. In this case each terminal has a code correlator which enables access to the terminal when the code is received from another terminal at the start of a message. This has the advantage over TDMA that it does not require time slots. Indeed, the transparent distributed switch network is well suited to CDMA as it will allow access to all customers, with the correct code, without the need for additional switching through a specific network path.

Whereas the abovedescribed couplers have two fibres (18, 20), one of which is provided with light retransmissive means (22) and signal conditioning means (24), the present invention includes within its scope couplers having more than two fibres, one of which is provided with light retransmissive means and signal conditioning means as abovedescribed, and wherein at least a further one of the fibres is provided with a respective light retransmissive means with or without a respective signal conditioning means.

We claim:

1. An optical coupler disposed as a star node in an optical signal distribution network wherein said coupler comprises:

a plurality of light transmissive elements communicatively coupled at a coupling point to couple light transmitted in each of the elements into each other of the elements, one of the light transmissive elements being provided with light retransmissive means for reapplying light leaving the coupler in that element back to the coupling point, said one element also being provided with signal conditioning means in the path of the light transmitted along the said one element; and in which the light reflective means are at least substantially totally reflective.

2. An optical coupler comprising a plurality of light transmissive elements communicatively coupled at a coupling point whereby in use light transmitted in each of the elements is coupled into each other of the elements, one of the elements being provided with light retransmissive means for reapplying light leaving the coupler in that element back to the coupling point, characterized in that the said one element is also provided with signal conditioning means in the path of the light transmitted along the one element; and in which the signal conditioning means are time slot selective.

3. An optical coupler comprising a plurality of light transmissive elements communicatively coupled at a coupling point whereby in use light transmitted in each of the elements is coupled into each other of the elements, one of the elements being provided with light retransmissive means for reapplying light leaving the coupler in that element back to the coupling point, characterized in that the said one element is also provided with signal conditioning means in the path of the light transmitted along the one element;

in which the light retransmissive means are a loop of light transmissive material having its ends coupled together and also coupled to the said one element; and in which the loop is a doped optical fibre loop and in which an energy pump is also coupled to the loop.

4. An optical coupler comprising a plurality of light transmissive elements communicatively coupled at a coupling point whereby in use light transmitted in each of the elements is coupled into each other of the elements, one of the elements being provided with light retransmissive means for reapplying light leaving the coupler in that element back to the coupling point, characterized in that the said one element is also provided with signal conditioning means in the path of the light transmitted along the one element;

in which the light retransmissive means are a loop of light transmissive material having its ends coupled together and also coupled to the said one element; and in which a laser amplifier is connected in the loop.

5. An optical switching network comprising an optical exchange transmitter, a plurality of customer terminals, and light transmissive elements connecting the customer terminals to the exchange transmitter, wherein the network includes:

at least one optical coupler for coupling a first plurality of light transmissive elements to a second plurality of light transmissive elements at a coupling point, a first element of the first plurality of elements being provided with light retransmissive means for re-applying light leaving the coupler in that element back to the coupling point, wherein said first element is also provided with signal conditioning means in the path of the light transmitted along said first element, whereby light transmitted along a second element of the first plurality of elements is coupled into each of the elements of the second plurality of elements, whereby light transmitted along any one of the second plurality of elements is coupled into each of the other elements of the second plurality of elements, and wherein the second element of the first plurality of elements connects the exchange transmitter to the coupler.

6. A network as in claim 5 in which the or each coupler constitutes a node in a distributed switch network.

7. An optical coupler for coupling a first plurality of light transmissive elements to a second plurality of light transmissive elements at a coupling point, a first element of the first plurality of elements being provided with light retransmissive means for re-applying light leaving the coupler in that element back to the coupling point, wherein said first element is also provided with signal conditioning means in the path of the light transmitted along said first element, whereby light transmitted along a second element of the first plurality of elements is coupled into each of the elements of the second plurality of elements, and whereby light transmitted along any one of the second plurality of elements is coupled into each of the other elements of the second plurality of elements.

8. A coupler as in claim 7 in which the light retransmissive means are light reflective means arranged to reflect light in the said one element back to the coupling point.

9. A coupler as in claim 8, in which at least a further one of the elements is provided with a respective light retransmissive means with or without a respective signal conditioning means.

10. A coupler as in claim 8 in which the light reflective means reflect the light in the one element back along it to the coupling point.

11. A coupler as in claim 8 in which the one element is terminated in the light reflective means.

12. A coupler as in claim 8 in which the signal conditioning means are disposed between the coupling point and the light reflective means.

13. A coupler as in claim 8 in which the light reflective means and the signal conditioning means are constituted by a single device.

14. A coupler as in claim 7 in which the signal conditioning means are a bi-directional light amplifier.

15. A coupler as in claim 14 in which the amplifier has a pair of light emitting ports, at least one of the ports being communicatively connected with the said one element.

16. A coupler as in claim 15 in which the other of the ports is coated with a light reflective coating constituting light reflective means.

17. A coupler as in claim 7 in which the signal conditioning means include a filter.

18. A coupler as in claim 17 in which the filter is wavelength selective.

19. A coupler as in claim 7 in which the light retransmissive means are a loop of light transmissive material having its ends coupled together and also coupled to the said one element.

* * * * *